(12) United States Patent
Matsumoto et al.

(10) Patent No.: US 11,644,397 B2
(45) Date of Patent: May 9, 2023

(54) LAMINATION SHAPING POWDER EVALUATION METHOD AND LAMINATION SHAPING POWDER THEREFOR

(71) Applicants: FUKUDA METAL FOIL & POWDER CO., LTD., Kyoto (JP); TECHNOLOGY RESEARCH ASSOCIATION FOR FUTURE ADDITIVE MANUFACTURING, Tokyo (JP)

(72) Inventors: Seiichi Matsumoto, Kyoto (JP); Yuji Sugitani, Kyoto (JP); Motonori Nishida, Kyoto (JP)

(73) Assignees: FUKUDA METAL FOIL & POWDER CO., LTD., Kyoto (JP); TECHNOLOGY RESEARCH ASSOCIATION FOR FUTURE ADDITIVE MANUFACTURING, Tokyo (JP)

( * ) Notice: Subject to any disclaimer, the term of this patent is extended or adjusted under 35 U.S.C. 154(b) by 108 days.

(21) Appl. No.: 16/641,963

(22) PCT Filed: Aug. 25, 2017

(86) PCT No.: PCT/JP2017/030510
§ 371 (c)(1),
(2) Date: Feb. 25, 2020

(87) PCT Pub. No.: WO2019/038910
PCT Pub. Date: Feb. 28, 2019

(65) Prior Publication Data
US 2020/0254517 A1   Aug. 13, 2020

(51) Int. Cl.
*G01N 15/02* (2006.01)
*G01N 15/00* (2006.01)
(Continued)

(52) U.S. Cl.
CPC .......... *G01N 15/0211* (2013.01); *B22F 10/28* (2021.01); *G01N 3/24* (2013.01);
(Continued)

(58) Field of Classification Search
CPC ....... G01N 2015/0096; G01N 15/0211; G01N 2015/0092
See application file for complete search history.

(56) References Cited

U.S. PATENT DOCUMENTS

2018/0161883 A1*   6/2018   Stawovy ................. B22F 9/082

FOREIGN PATENT DOCUMENTS

| CN | 1756609 A | 4/2006 |
|---|---|---|
| CN | 101184565 A | 5/2008 |

(Continued)

OTHER PUBLICATIONS

Erhard Klar, David F. Berry, Copper Powder Metallurgy Products, Properties and Selection: Nonferrous Alloys and Special-Purpose Materials, vol. 2, ASM Handbook, by ASM Handbook Committee, ASM International, 1990, p. 392-402 (Year: 1990).*
(Continued)

*Primary Examiner* — Paul M. West
(74) *Attorney, Agent, or Firm* — Ladas & Parry LLP

(57) ABSTRACT

This invention relates to a method of evaluating a squeegeeing property of powder for lamination shaping by stable criteria. In this method, the squeegeeing property is evaluated using at least a satellite adhesion ratio of the powder and an apparent density of the powder. The satellite adhesion ratio is the ratio of the number of particles on which satellites are adhered to the number of all particles. If the satellite adhesion ratio is equal to or less than 50%, and the apparent density is equal to or more than 3.5 g/cm$^3$, the squeegeeing property is evaluated as that the powder can be spread into a uniform powder layer in the lamination shap-
(Continued)

ing. Furthermore, if the 50% particle size of a powder obtained by a laser diffraction method is 3 to 250 μm, the squeegeeing property is evaluated as that the powder can be spread into a uniform powder layer in the lamination shaping.

10 Claims, 29 Drawing Sheets

(51) Int. Cl.
  *B22F 10/28* (2021.01)
  *G01N 3/24* (2006.01)
(52) U.S. Cl.
  CPC ............... *G01N 2015/0092* (2013.01); *G01N 2015/0096* (2013.01)

(56) References Cited

FOREIGN PATENT DOCUMENTS

| CN | 105642879 A | | 6/2016 |
|----|---|---|---|
| CN | 106277960 A | | 1/2017 |
| EP | 1118404 A1 | | 7/2001 |
| JP | 6140540 A | | 2/1986 |
| JP | 2013194254 A | | 9/2013 |
| JP | 2015000445 A | | 1/2015 |
| JP | 2016-102229 A | | 6/2016 |
| JP | 2016172904 A | | 9/2016 |
| JP | 2016204700 A | | 12/2016 |
| JP | 2017066432 A | | 4/2017 |
| JP | 2017066432 A | * | 4/2017 |
| JP | 2017115666 A | | 6/2017 |
| JP | 2017127998 A | | 7/2017 |
| JP | 2019-537524 A | | 12/2019 |
| WO | 2016031279 A1 | | 3/2016 |
| WO | 2016/158687 A1 | | 10/2016 |
| WO | 2017110445 | | 6/2017 |
| WO | 2019038909 A1 | | 10/2020 |

OTHER PUBLICATIONS

Schulze, Dietmar "Shear Testing of Powders for Process Optimization", Annual Transactions of the Nordic Rheology Society, vol. 21, 2013. (Year: 2013).*
International Search Report (ISR) and Written Opinion (WO) dated Nov. 28, 2017 for Application No. PCT/JP2017/030510.
Japanese Industrial Standards (JIS Z 2502: 2012), "Metallic powders-Determination of flow rate by means of a calibrated funnel", 6 pages.
2013, pp. 1-4 (The Association of Powder Process Industry and Engineering, Japan, Direct shear testing method of powder bed, Standards of APPIE, The Association of Powder Process Industry and Engineering, Japan), SAP15-13: 2013.
Japanese Office Action with an English translation dated Feb. 16, 2021 for corresponding Japanese Application No. JP 2016-537525.
Espacenet English abstract of JP 2016-102229 A.
Espacenet English abstract of WO 2016/158687 A1.
Espacenet English abstract JP 2019-537524 A.
Office Action with an English translation dated Mar. 2, 2022 for Chinese Patent Application No. 201780093805.7.
Extended European Search Report dated Jan. 15, 2021 for Application No. EP 17922580.0.
Espacenet English abstract of CN 105642879 A, 2016.

* cited by examiner

EXAMPLE 1

EXAMPLE 2

EXAMPLE 3

EXAMPLE 4

EXAMPLE 5

EXAMPLE 6

EXAMPLE 7

EXAMPLE 8

EXAMPLE 9

EXAMPLE 10

EXAMPLE 11

EXAMPLE 12

EXAMPLE 13

EXAMPLE 14

EXAMPLE 15

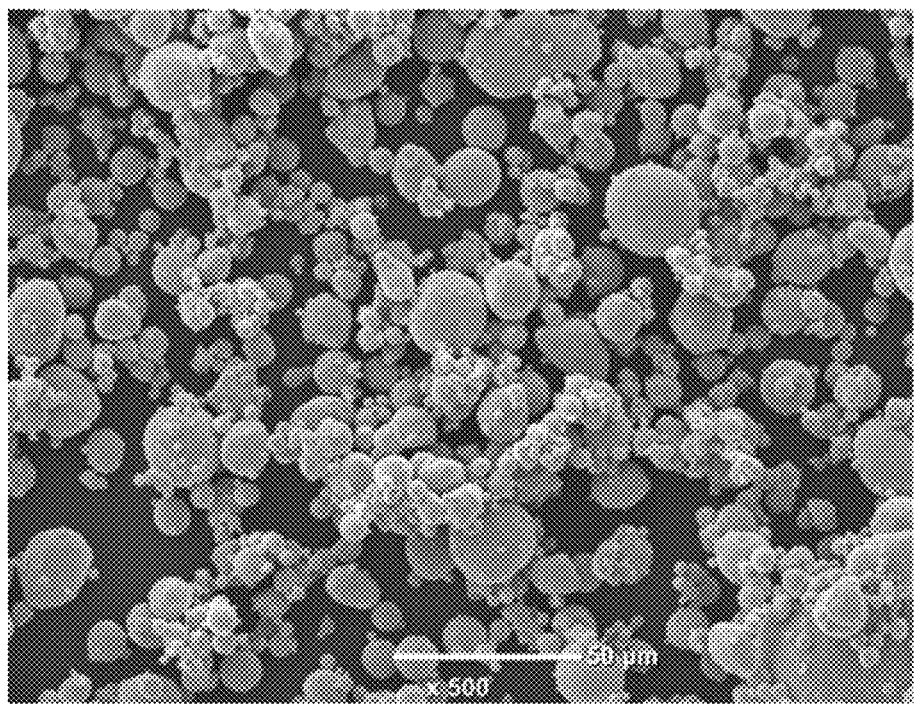
COMPARATIVE EXAMPLE 1
F I G. 3A

COMPARATIVE EXAMPLE 2

COMPARATIVE EXAMPLE 3

COMPARATIVE EXAMPLE 4

COMPARATIVE EXAMPLE 5

COMPARATIVE EXAMPLE 6

| SQUEEGEEING CONDITIONS | | EXAMPLE 1 | EXAMPLE 2 | EXAMPLE 3 |
|---|---|---|---|---|
| VELOCITY | AMOUNT | | | |
| LOW | LARGE | | | |
| LOW | SMALL | | | |
| HIGH | | | | |

FIG. 5A

| SQUEEGEEING CONDITIONS | | COMPARATIVE EXAMPLE 1 | COMPARATIVE EXAMPLE 2 | COMPARATIVE EXAMPLE 3 |
|---|---|---|---|---|
| VELOCITY | AMOUNT | | | |
| LOW | LARGE | | | |
| LOW | SMALL | | | |
| HIGH | | | | |

FIG. 6

LAMINATION SHAPING POWDER EVALUATION METHOD AND LAMINATION SHAPING POWDER THEREFOR

RELATED APPLICATION

This application is an application under 35 U.S.C. 371 of International Application No. PCT/JP2017/030510 filed on Aug. 25, 2017, the entire contents of which are incorporated herein by reference.

TECHNICAL FIELD

The present invention relates to a lamination shaping powder evaluation method and a lamination shaping powder therefor.

BACKGROUND ART

In the abovementioned technical field, patent literature 1 discloses a technique by which the measurement value of the fluidity complying with JIS Z 2502 is set at 10 to 25 sec/50 g as a condition when using WC-base hard metal particles as lamination shaping granules. Non-patent literature 1 also describes the standards of JIS Z 2502 as a metal powder-fluidity measurement method. In addition, patent literature 2 discloses a technique that evaluates the flowability of aluminum particles by criteria including the average roundness, the average particle size, and the satellite state.

CITATION LIST

Patent Literature

Patent literature 1: Japanese Patent Laid-Open No. 2016-172904
Patent literature 2: Japanese Patent Laid-Open No. 2017-066432

Non-Patent Literature

Non-patent literature 1: Japanese Industrial Standards (JIS Z 2502: 2012), "Metallic powders-Determination of flow rate by means of a calibrated funnel"

SUMMARY OF THE INVENTION

Technical Problem

Unfortunately, the measurement of the fluidity complying with JIS Z 2502 using the technique described in the above literature is unstable as a criterion of a lamination shaping powder because a fine powder probably usable for lamination shaping cannot be measured or the same powder can be measured or cannot be measured due to a slight change in measurement environment. This makes the evaluation of a lamination shaping powder insufficient. Also, the evaluation of the satellite adhesion ratio, the fine particle ratio, and the average roundness as the evaluation of the flowability of aluminum particles disclosed in patent literature 2 is not directly related to the evaluation of the squeegeeing property of a powder in a laminating and shaping apparatus.

The present invention provides a technique of solving the above-described problem.

Solution to Problem

One example aspect of the present invention provides a method of evaluating a squeegeeing property of powder for lamination shaping, wherein the squeegeeing property is evaluated using at least a satellite adhesion ratio of the powder and an apparent density of the powder.

Another example aspect of the present invention provides powder, which has been evaluated to be spread into a uniform powder layer in lamination shaping by the above-mentioned method.

Advantageous Effects of Invention

According to the present invention, the squeegeeing property of a lamination shaping powder can be evaluated by stable criteria.

BRIEF DESCRIPTION OF DRAWINGS

FIG. 2I is a view showing a scanning electron microscope (SEM) image for measuring the satellite adhesion ratio of a powder of Example 9 of the present invention;

FIG. 2O is a view showing a scanning electron microscope (SEM) image for measuring the satellite adhesion ratio of a powder of Example 15 of the present invention;

FIG. 3A is a view showing a scanning electron microscope (SEM) image for measuring the satellite adhesion ratio of a powder of Comparative Example 1 of the present invention;

FIG. 5A is a view showing the test results of the squeegeeing properties of powders of Examples 1 to 3 of the present invention;

FIG. 6 is a view showing the test results of the squeegeeing properties of powders of Comparative Examples 1 to 3 of the present invention;

DESCRIPTION OF EXAMPLE EMBODIMENTS

Example embodiments of the present invention will now be described in detail with reference to the drawings. It should be noted that the relative arrangement of the components, the numerical expressions and numerical values set forth in these example embodiments do not limit the scope of the present invention unless it is specifically stated otherwise.

First Example Embodiment

<<Manufacture of Laminated and Shaped Product>>

Figure 1:
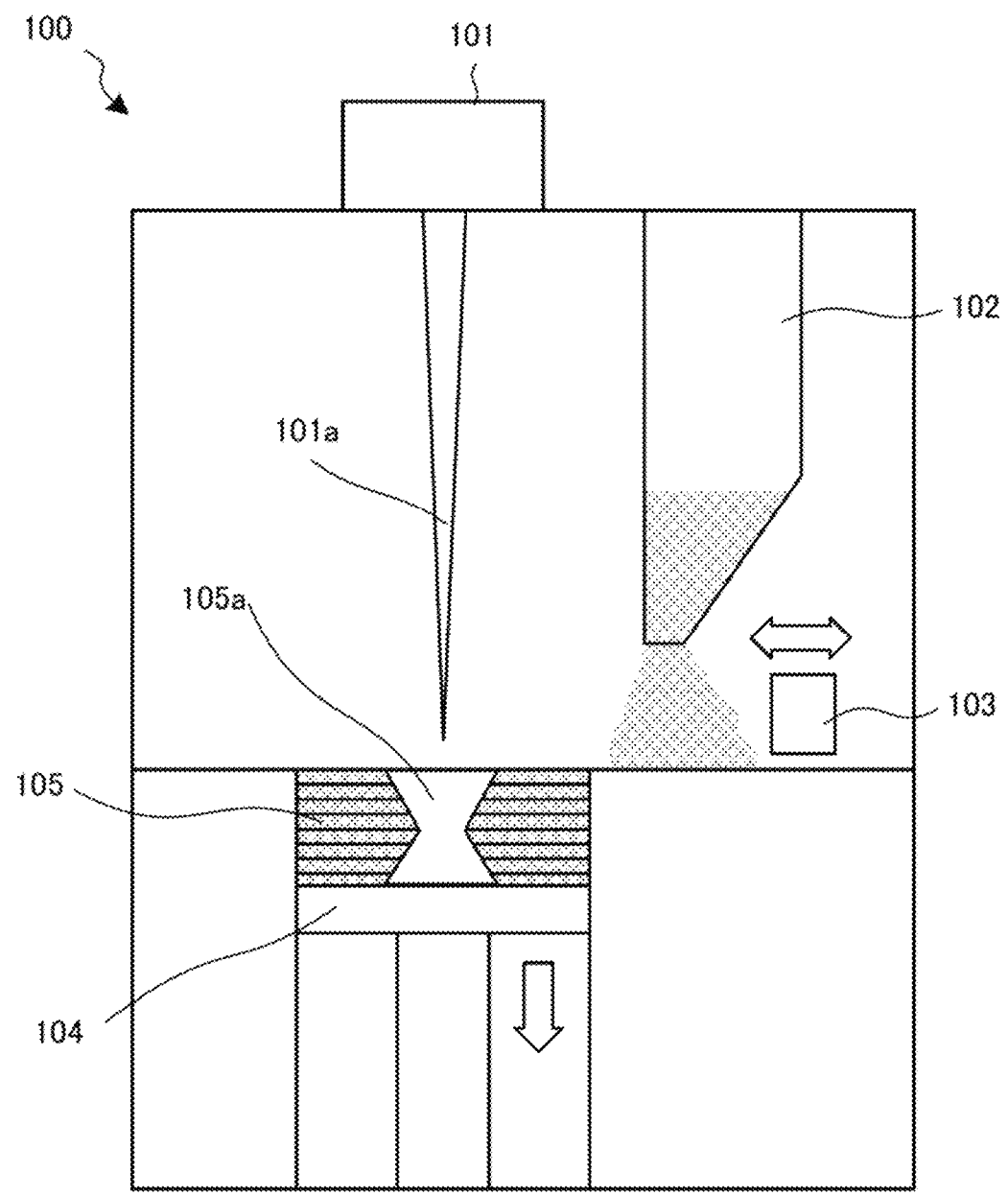
FIG. 1 is a view showing a configuration example of a laminating and shaping apparatus of an example embodiment according to the present invention.

FIG. 1 is a view showing a schematic configuration example of a laminating and shaping apparatus 100 of this example embodiment. The laminating and shaping apparatus 100 includes an emission mechanism 101 for an electron beam or fiber laser 101a, a hopper 102 as a powder tank, a squeegeeing blade 103 for forming a powder bed by spreading a powder by a predetermined thickness, and a table 104 that repetitively moves down by a predetermined thickness in order to perform lamination. The squeegeeing blade 103 and the table 104 cooperate with each other to generate a powder laminated portion 105 having a uniform predetermined thickness. Each layer is irradiated with the fiber laser 101a based on slice data obtained from 3D-CAD data, thereby melting a metal powder (in this example embodiment, a metal powder, particularly a copper powder or a copper alloy powder) and manufacturing a laminated and shaped product 105a.

As described above, a manufactured product having an arbitrary shape can be obtained by melting and solidifying a lamination shaping powder by using the electron beam or fiber laser 101a as a heat source. For example, when using a copper powder, fine manufacturing can be performed in the fields of electric circuit connectors, heat sinks, and heat exchangers. However, the lamination shaping powder is not limited to a metal powder such as a copper powder.

«Manufacture of Lamination Shaping Powder»

The lamination shaping powder of this example embodiment can be manufactured by, e.g., "a rotating disk method", "a gas atomizing method", "a water atomizing method", "a plasma atomizing method", or "a plasma rotating electrode method". In this example embodiment, "the gas atomizing method" was used among these methods. In this gas atomization, a gas such as helium, argon, or nitrogen was used, and a lamination shaping powder was manufactured by controlling powdering by adjusting the pressure and flow rate of the gas. However, a similar lamination shaping powder can also be manufactured by using another manufacturing method. The manufactured lamination shaping powder was classified by a predetermined classification size.

«Conditions Usable as Lamination Shaping Powder»

Conditions usable as a lamination shaping powder are presumably as follows:

(1) A powder has a squeegeeing property capable of forming a powder bed when spread by a predetermined thickness.
(2) A powder can be melted and shaped when irradiated with an electron beam or a fiber laser.
(3) A laminated and shaped product formed by lamination shaping has properties that withstand the conditions of each application.

Of these conditions, the squeegeeing property is a criterion for determining whether a powder can be used by the laminating and shaping apparatus 100, and a powder having an insufficient squeegeeing property is basically excluded from the lamination shaping powder.

«Evaluation Targets of Squeegeeing Property»

A powder having a sufficient squeegeeing property requires the following conditions.

(1) The particle size of the lamination shaping powder particles falls within a range in which a powder bed can be formed. For example, when the 50% particle size of powder particles is measured or calculated by a laser diffraction method, the 50% particle size falls within a predetermined range.
(2) The powder packing ratio of the lamination shaping powder falls within a range appropriate for powder bed formation. For example, when the apparent density (AD) of the power is measured or calculated, the AD falls within a predetermined range.
(3) The flowability of the lamination shaping powder falls within a range in which the power can be supplied from a supply hopper and an appropriate powder bed can be formed. For example, when the flowability of the powder is measured or calculated, the flowability falls within a predetermined range.

«Evaluation of Flowability»

The flowability is evaluated by using the flow rate (FR) complying with JIS Z 2502 as disclosed in patent literature 1 and non-patent literature 1. However, the measurement of the fluidity complying with JIS Z 2502 is unstable as a criterion of a lamination shaping powder because a fine powder probably usable for lamination shaping cannot be measured or the same powder can be measured or cannot be measured due to a slight change in measurement environment. This makes the evaluation of a lamination shaping powder insufficient.

For example, a fine powder having an average particle size of 20 to 45 μm is generally used as a powder for lamination shaping, but the use of a finer powder of 20 μm or less is desirable in the future. A fine powder has a strong adhesive force and hence has a low flowability, and this makes it difficult to generate a powder layer necessary for lamination shaping. It is sometimes impossible to measure a fine powder like this by using JIS Z 2502, so this method is insufficient to properly evaluate the flow form of a powder for lamination shaping. If measurement is impossible, it becomes difficult to evaluate the powder as a lamination shaping powder. In practice, however, it is sometimes possible to laminate even an unmeasurable fine powder depending on an apparatus or a supply method, and this makes evaluation difficult.

For example, the flowability and the spreadability of a powder are hindered if the powder has a nonuniform shape due to strain or a large amount of satellites are adhered on the powder, and no uniform powder layer can be formed. Since this generates pores or decreases the density, a high-density high-quality homogeneous manufactured product cannot be obtained. A powder is ideally closer to a spherical shape in order to obtain a sufficient flowability and a sufficient spreadability. However, the manufacturing cost rises in order to obtain a powder having a higher spherical degree. The present inventors made extensive studies and have found that it is possible to ensure a sufficient flowability and a sufficient spreadability suitable for lamination shaping by controlling the satellite adhesion amount to a predetermined amount or less.

In this example embodiment, therefore, as a standard of the flowability, not the method complying with JIS Z 2502 that makes measurement results unstable but the satellite adhesion ratio with which measurement results are stably obtainable is used as an evaluation criterion of the flowability and combined with other evaluation targets. The "satellite adhesion ratio" of powder particles is the ratio of the number of powder particles on which satellites are adhered to the number of all particles including powder particles on which no satellites are adhered.

(Satellite Adhesion Ratio Measurement Method)

In this example embodiment, from a scanning electron microscope (EM) image obtained by capturing a manufactured powder, the satellite adhesion ratio of the whole powder was calculated by counting powder particles on which satellites were adhered and powder particles on which no satellites were adhered. Note that it is also possible to extract the number of powder particles on which satellites are adhered and the number of particles on which no satellites are adhered, by image processing of a scanning electron microscope (SEM) image, and calculate the satellite adhesion ratio of the whole powder.

(Evaluation of Squeegeeing Property)

Figure 4:
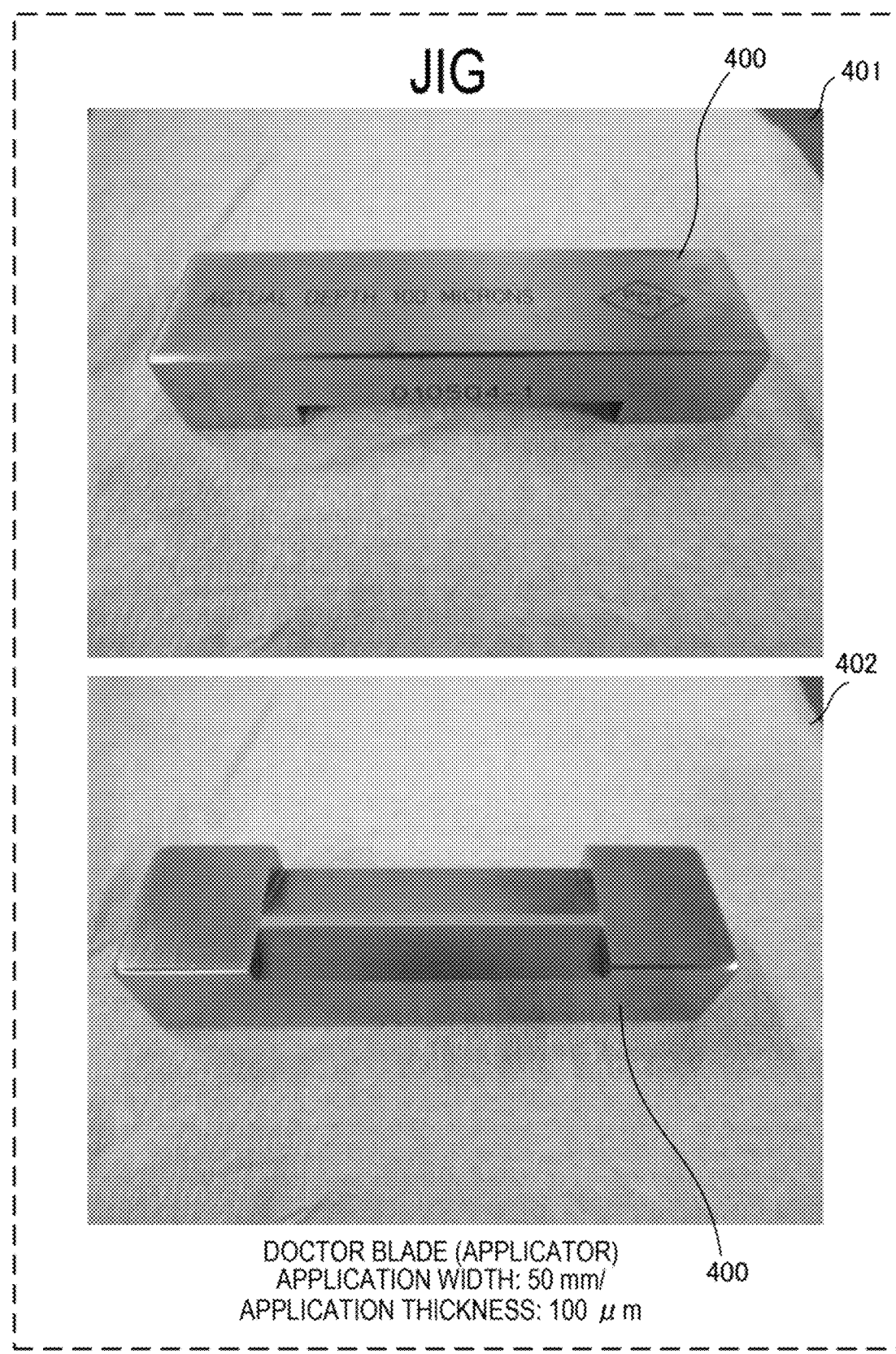
FIG. 4 is a view showing a jig to be used to test a squeegeeing property in the first example embodiment of the present invention.

FIG. 4 is a view showing a jig 400 for testing the squeegeeing property in this example embodiment. An upper view 401 of FIG. 4 is a view showing the jig 400 from its upper surface, and a lower view 402 of FIG. 4 is a view showing the jig 400 from its bottom surface. The jig 400 is called a doctor blade or an applicator, and obtained by forming a gap by processing one surface of a metal block. The jig 400 can apply a paint or ink with a predetermined film thickness.

In this example embodiment, the two ends of the jig 400 having an application width of 50 mm and an application thickness of 100 μm were picked up, and the jig 400 was pressed against the table 104 of the laminating and shaping apparatus 100 or against an equivalent horizontal plate and pulled at a predetermined velocity, thereby forming a powder layer. After that, whether a uniform powder layer was formed was observed. Note that this process was repetitively performed by changing the initial powder amount or the velocity.

In addition, the relationship between the squeegeeing property test using the jig 400 and the squeegeeing property obtained by the laminating and shaping apparatus 100 was confirmed by squeegeeing a powder by using the laminating and shaping apparatus 100.

«Evaluation Criteria of Squeegeeing Property»

From the relationship between the abovementioned characteristics measured from the powders, the squeegeeing property test using the jig, and the squeegeeing property obtained by the laminating and shaping apparatus, the following evaluation criteria were obtained when using a copper powder or a copper alloy powder.

(1) The 50% particle size of copper powder particles is 3 to 250 μm when measured by a laser diffraction method. For example, if the 50% particle size of copper powder particles is less than 3 μm, there is no flowability, and no powder bed can be formed even in an SLM type laminating and shaping apparatus. On the other hand, if the 50% particle size of copper powder particles is larger than 250 μm, the surface of a powder bed roughens and no powder bed appropriate for shaping can be formed even in an EBM type laminating and shaping apparatus.

(2) The apparent density (AD) of a copper powder is equal to or more than 3.5 $g/cm^3$. For example, if the apparent density of a copper powder is less than 3.5 $g/cm^3$, the powder packing ratio of a powder bed decreases and no appropriate powder bed can be formed in a laminating and shaping apparatus.

(3) The flowability (satellite adhesion ratio) of a copper powder is equal to or less than 50%. If the flowability of a copper powder is more than 50%, a supply hopper cannot supply the powder and no appropriate powder bed cannot be formed in a laminating and shaping apparatus.

Of the abovementioned three conditions, (2) the apparent density changes in accordance with the type of lamination shaping powder or the type of metal, but (1) the 50% particle size and (3) the flowability (satellite adhesion ratio) fall within similar ranges regardless of the type of laminating and shaping apparatus or the type of metal. Evaluation by (3) the flowability (satellite adhesion ratio) is essential, and at least one of (1) the 50% particle size and (2) the apparent density restricts the conditions of a lamination shaping powder.

«Effects of This Example Embodiment»

In this example embodiment, a lamination shaping powder can be evaluated by stable criteria. Also, the stable criteria make it possible to easily find a powder usable as a lamination shaping powder.

In addition, it is possible to spread a uniform powder layer, and obtain a high-density high-quality homogeneous manufactured product not having defects such as segregation and voids. It is also possible to reduce the material cost when using a copper powder or a copper alloy powder in lamination shaping.

That is, if the satellite adhesion ratio exceeds 50%, the squeegeeing property of the powder deteriorates. Also, the conductivity decreases, and this may hinder temporary sintering in a preheating step of electron-beam lamination shaping.

Furthermore, if the apparent density is less than 3.5 g/cm$^3$, the packing property of the powder in the powder layer deteriorates, and the density of the manufactured product decreases because pores are formed in the manufactured product.

Also, if the 50% particle size measured by the laser diffraction method is less than 3 μm, the powder causes surface defects, e.g., violently scatters and adheres to the manufactured product again. If the 50% particle size is larger than 75 μm in lamination shaping using a laser beam, or if the 50% particle size is larger than 250 μm in lamination shaping using an electron beam, the surface of the manufactured product roughens and causes an appearance defect. Alternatively, a melt pool formed in a powder layer during beam irradiation does not reach a solidified layer immediately below the pool. Since this causes insufficient melting and solidification, a shaping defect occurs.

Second Example Embodiment

In this example embodiment, a lamination shaping powder is evaluated by further taking account of the "adhesive force" of the powder particles. The "adhesive force" is calculated based on a shearing force test.

For example, a fine powder having an average particle size of 20 to 45 μm is generally used as a powder for lamination shaping, but the use of a finer powder of 20 μm or less is desirable in the future. A fine powder has a strong adhesive force and hence has a low flowability, and this makes it difficult to generate a powder layer necessary for lamination shaping. It is sometimes impossible to measure a fine powder like this by using JIS Z 2502, so this method is insufficient to properly evaluate the flow form of a powder for lamination shaping. If measurement is impossible, it becomes difficult to evaluate the powder as a lamination shaping powder. In practice, however, it is sometimes possible to laminate even an unmeasurable fine powder depending on an apparatus or a supply method, and this makes evaluation difficult.

The flowability of a fine powder is low because the adhesive force between particles forming a fine powder is strong and the kinetic energy of the particles is very low. It is known that the adhesive force of a powder relatively increases as the particle size decreases. The adhesive force functions as binding power that hinders the flowability of a powder. On the other hand, the kinetic energy is proportional to the mass, but the mass of a particle is proportional to the cube of the particle size, so the kinetic energy of a fine particle becomes very low. Consequently, the gravity and the inertia force necessary to move particles become low and cannot exceed the adhesive force as binding power. This makes it impossible to cause the flow of a powder.

«Measurement of Adhesive Force»

In this example embodiment, the adhesive force with which measurement results are stably obtainable is further used as an evaluation criterion of the flowability and combined with other evaluation targets.

(Adhesive Force Measurement Method)

Figure 8A:
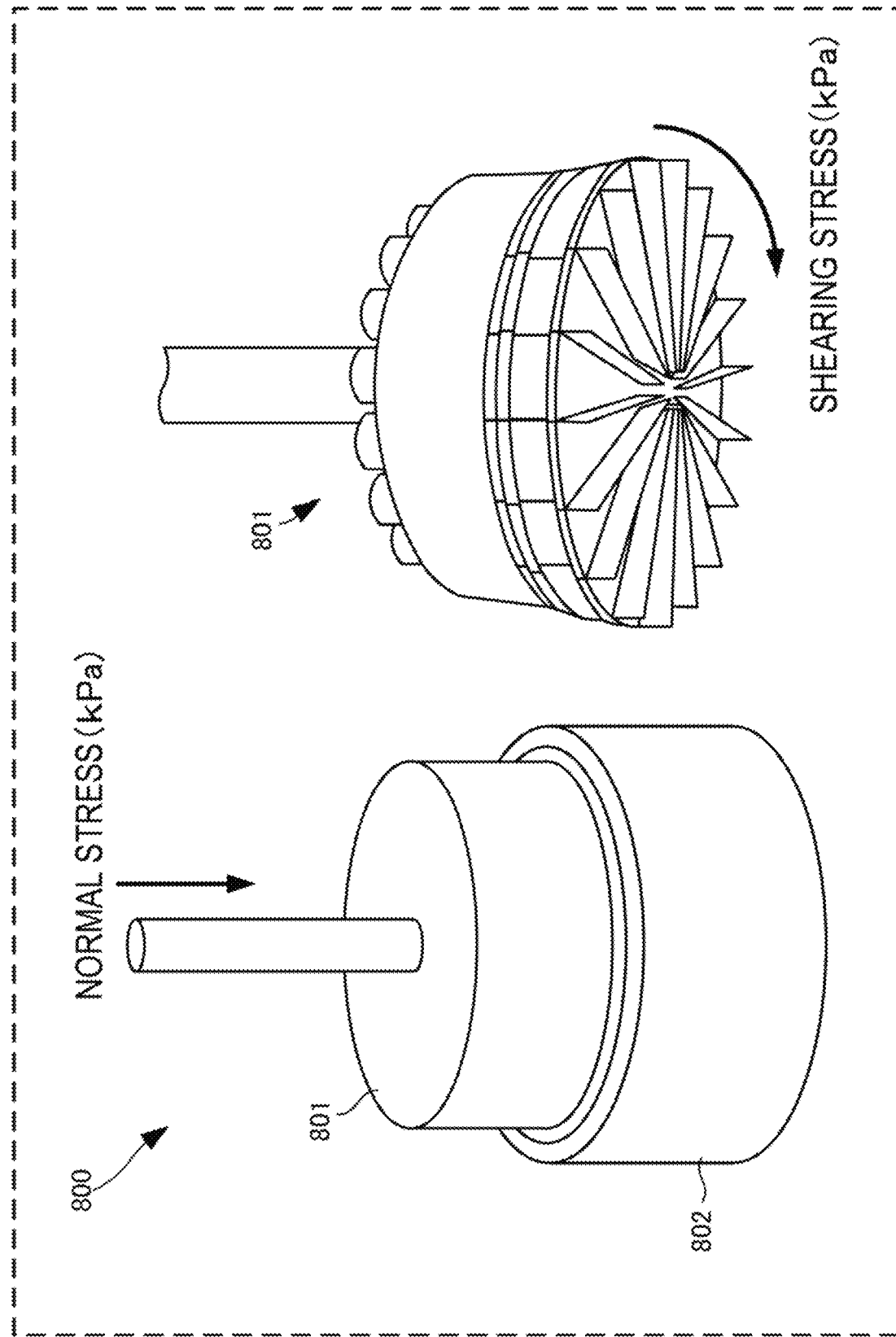
FIG. 8A is a view showing the arrangement of a shearing stress measurement unit for measuring a shearing stress in the second example embodiment of the present invention.

FIG. 8A is a view showing the arrangement of a shearing stress measurement unit 800 for measuring the shearing stress in this example embodiment. The shearing stress measurement unit 800 measures the shearing stress by a rotary cell method. A rotary cell 801 including a blade attached to its lower portion is placed inside an external cell 802, and a powder to be measured is packed in the upper portion of the external cell 802. While a predetermined normal stress is applied from the rotary cell 801 to the external cell 802, the shearing stress is measured from the torque of the rotary cell 801.

Figure 8B:
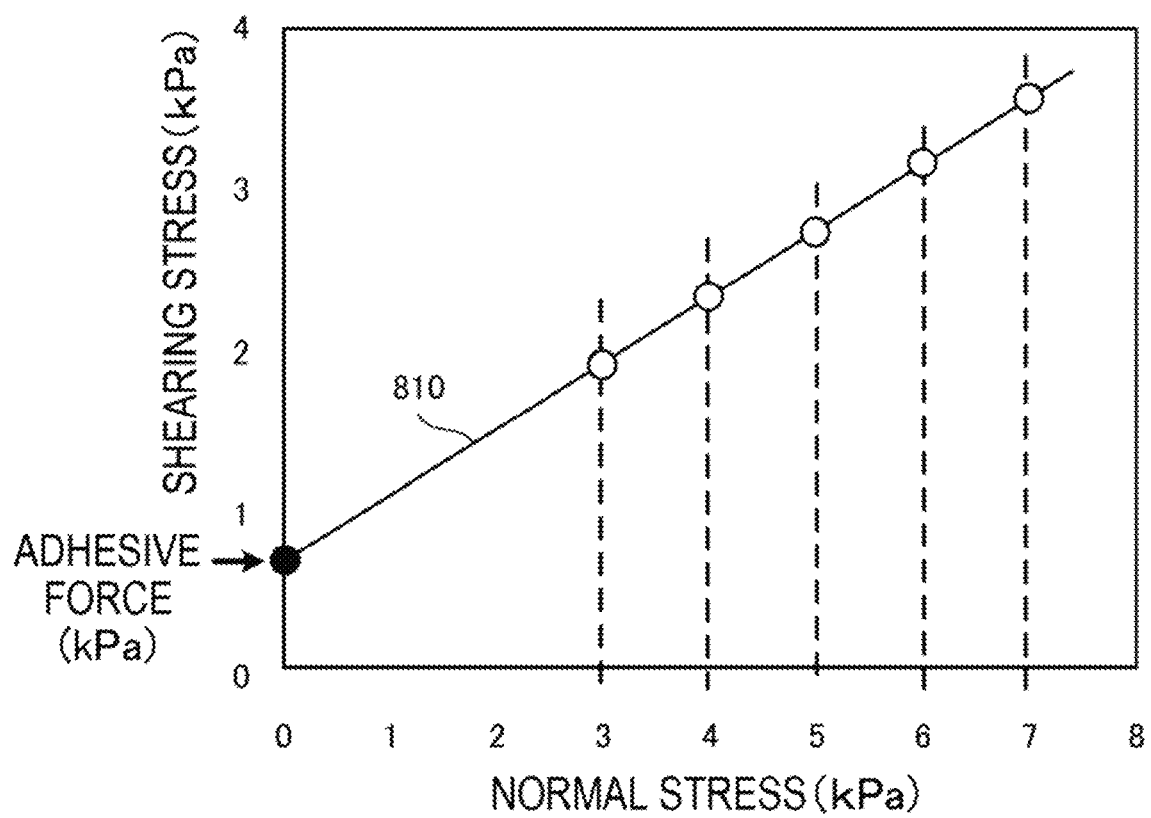
FIG. 8B is a view showing a method of obtaining an adhesive force based on the shearing stress measured by the shearing stress measurement unit in the second example embodiment of the present invention.

FIG. 8B is a graph showing a method of obtaining the adhesive force based on the shearing stress measured by the shearing stress measurement unit 800. As shown in FIG. 8B, a line obtained by plotting the shearing stress measured by the shearing stress measurement unit 800 when shear occurs under each normal stress is called a failure envelope, and a powder layer slips if a shearing stress stronger than the failure envelope is applied. A shearing stress when the normal stress is 0 (zero) on the failure envelope (e.g., 810) is calculated as the adhesive force between particles.

«Effects of This Example Embodiment»

According to this example embodiment, it is possible to more accurately evaluate whether a lamination shaping powder is usable.

EXAMPLES

By using Examples 1 to 15 according to this example embodiment and Comparative Examples 1 to 6, the evaluation criteria of the lamination shaping powder evaluation method of this example embodiment will be verified from the relationship between the evaluation results of evaluated lamination shaping powders, the squeegeeing property test using the jig, and the squeegeeing property of the laminating and shaping apparatus.

«Manufacture of Lamination Shaping Copper Powders»

By using gases such as helium, argon, and nitrogen as gas atomization of a gas atomizing method, copper powders or copper alloy powders were generated by controlling powdering by adjusting the pressure and flow rate of each gas, and the evaluation criteria of the lamination shaping powder evaluation method of this example embodiment were verified. However, the following examples can be referred to even for another powder or another metal powder.

«Measurement of Satellite Adhesion Ratio»

Figure 2A:
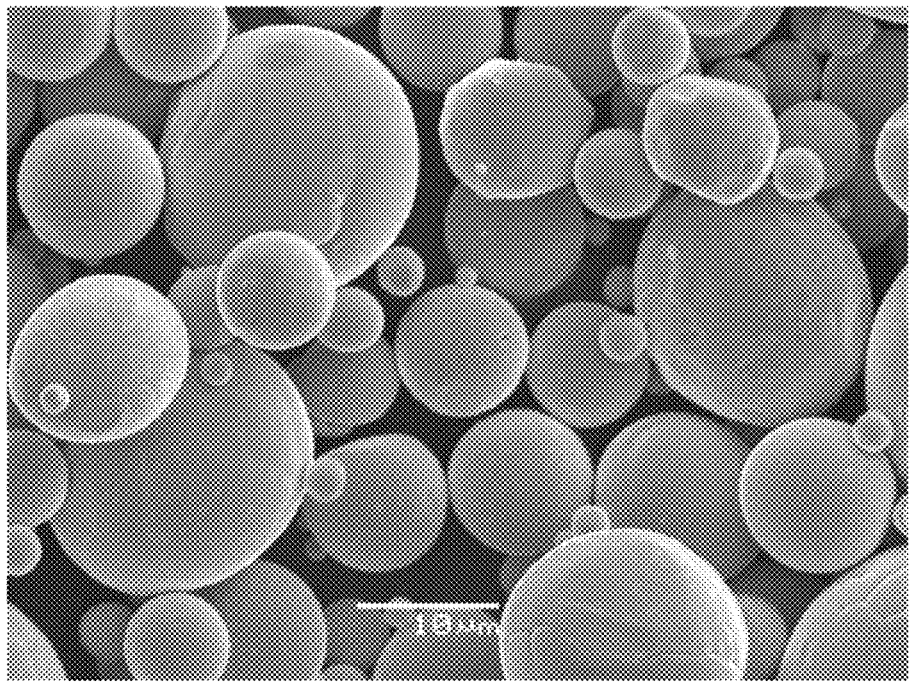
FIG. 2A is a view showing a scanning electron microscope (SEM) image for measuring the satellite adhesion ratio of a powder of Example 1 of the present invention.
Figure 2B:
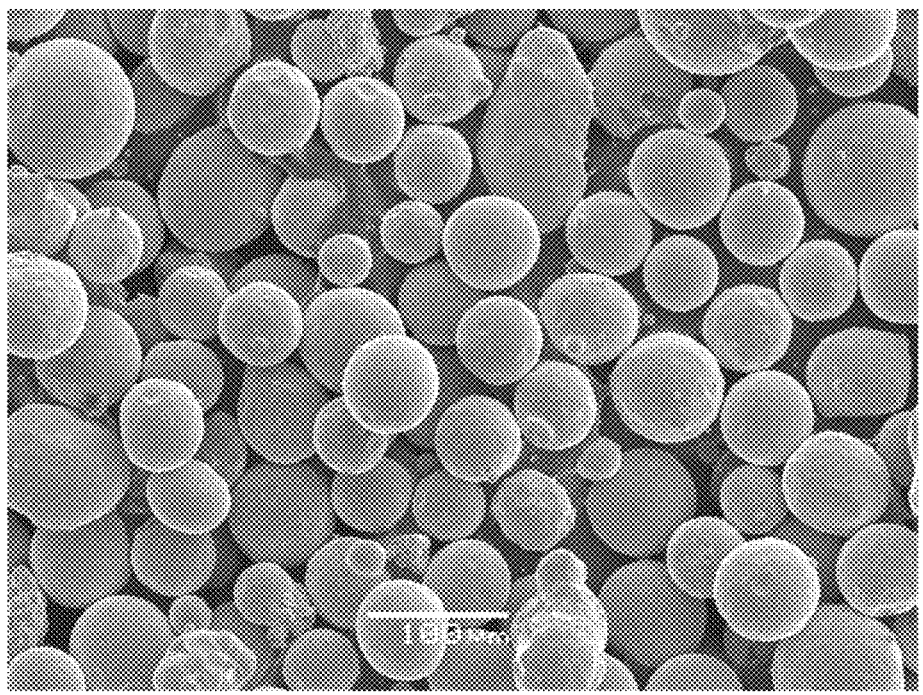
FIG. 2B is a view showing a scanning electron microscope (SEM) image for measuring the satellite adhesion ratio of a powder of Example 2 of the present invention.
Figure 2C:
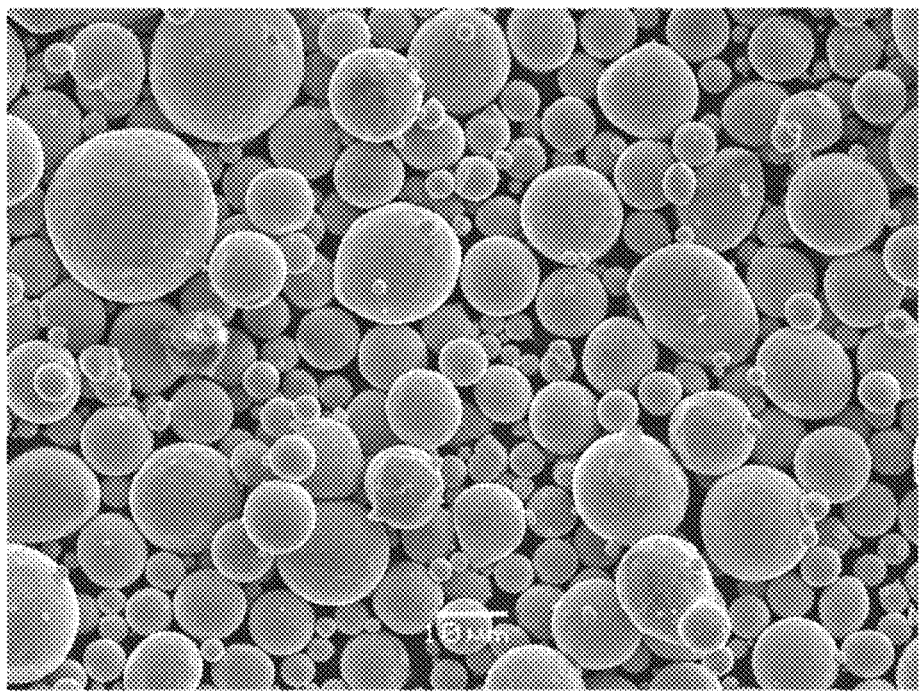
FIG. 2C is a view showing a scanning electron microscope (SEM) image for measuring the satellite adhesion ratio of a powder of Example 3 of the present invention.
Figure 2D:
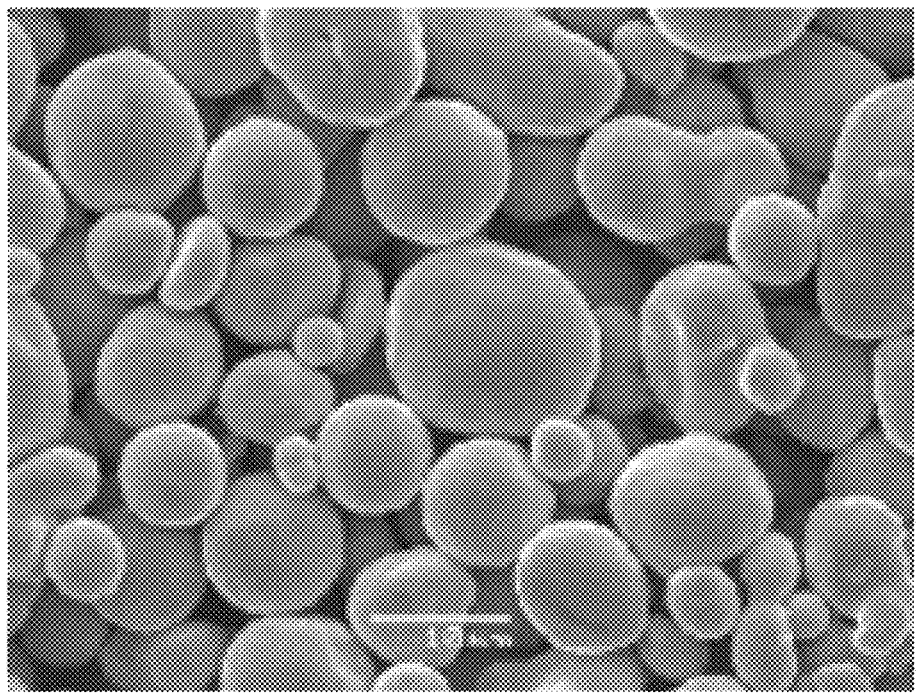
FIG. 2D is a view showing a scanning electron microscope (SEM) image for measuring the satellite adhesion ratio of a powder of Example 4 of the present invention.
Figure 2E:
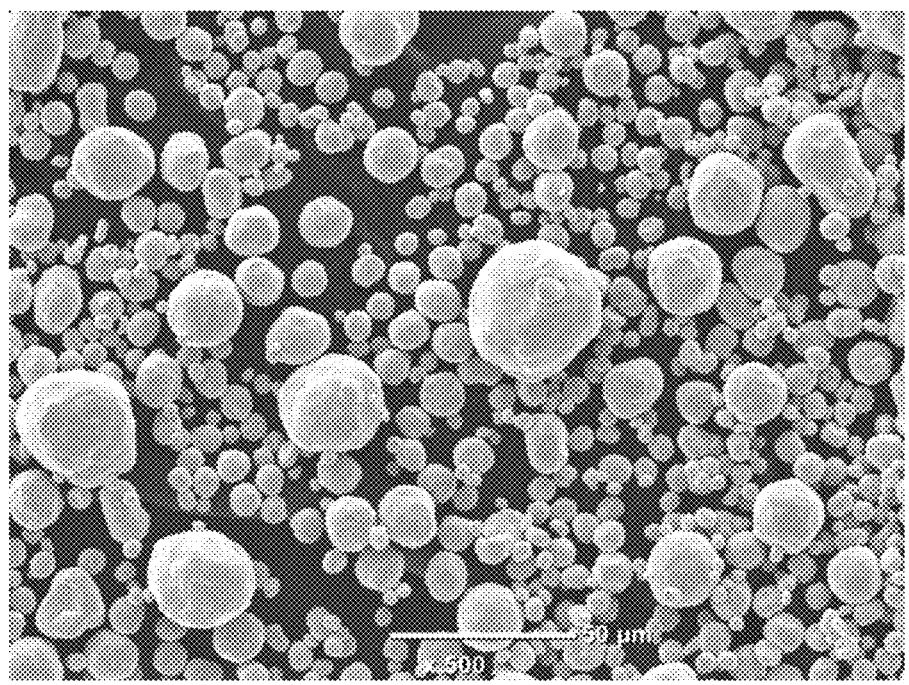
FIG. 2E is a view showing a scanning electron microscope (SEM) image for measuring the satellite adhesion ratio of a powder of Example 5 of the present invention.
Figure 2F:
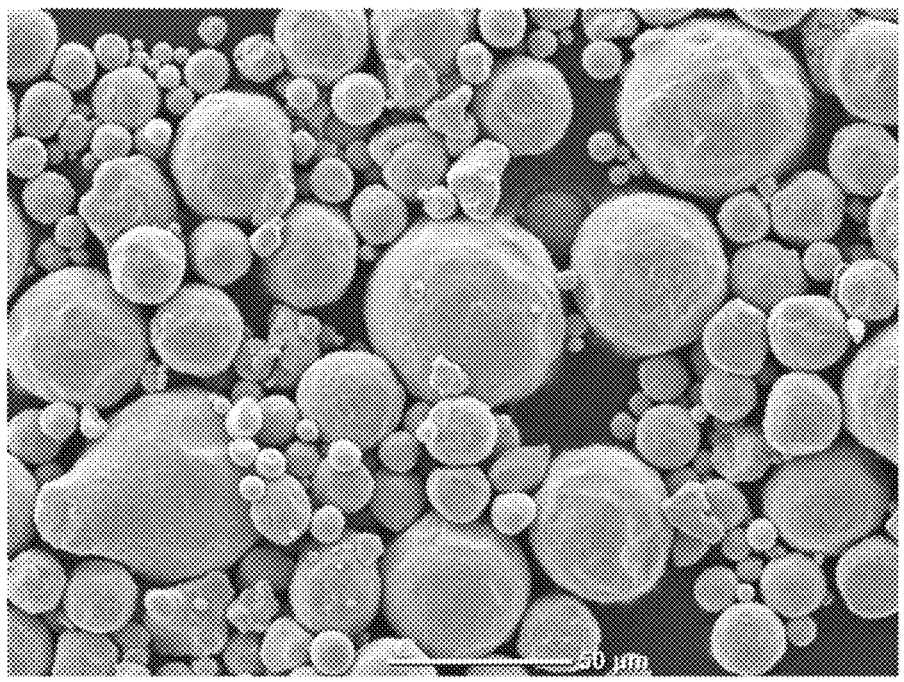
FIG. 2F is a view showing a scanning electron microscope (SEM) image for measuring the satellite adhesion ratio of a powder of Example 6 of the present invention.
Figure 2G:
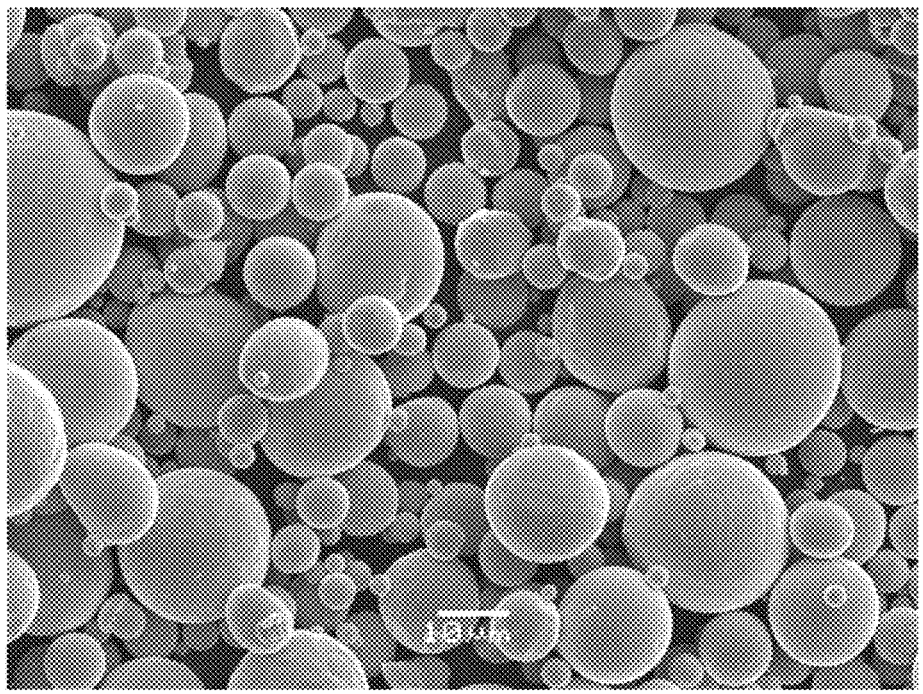
FIG. 2G is a view showing a scanning electron microscope (SEM) image for measuring the satellite adhesion ratio of a powder of Example 7 of the present invention.
Figure 2H:
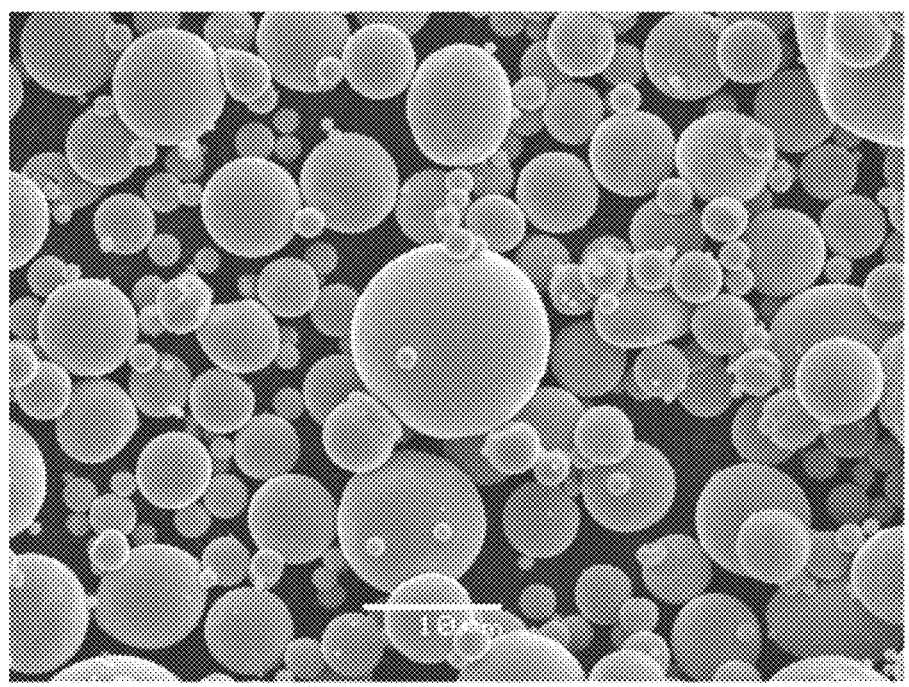
FIG. 2H is a view showing a scanning electron microscope (SEM) image for measuring the satellite adhesion ratio of a powder of Example 8 of the present invention.
Figure 21:
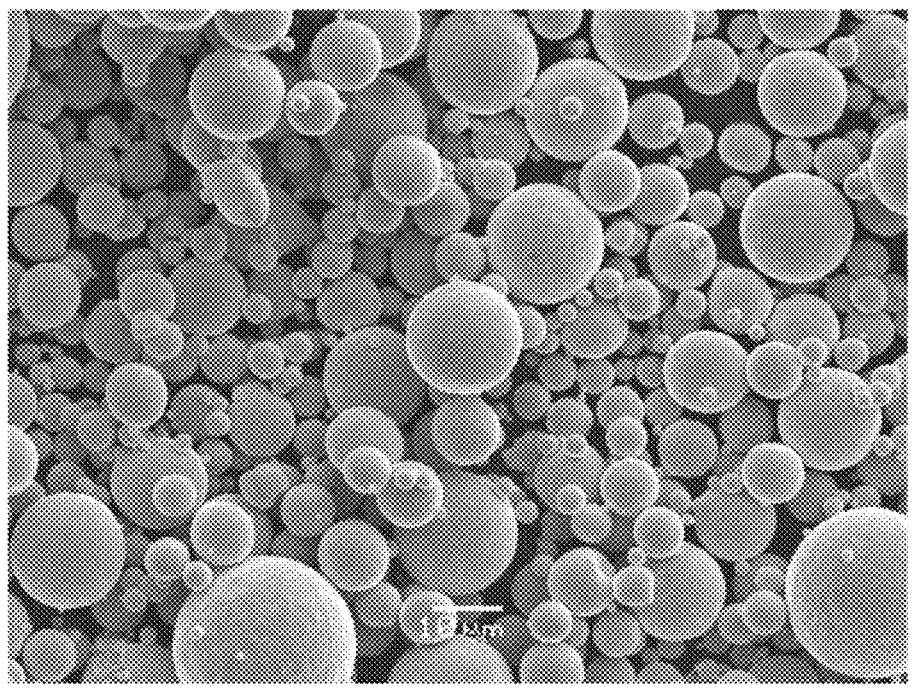
Figure 2J:
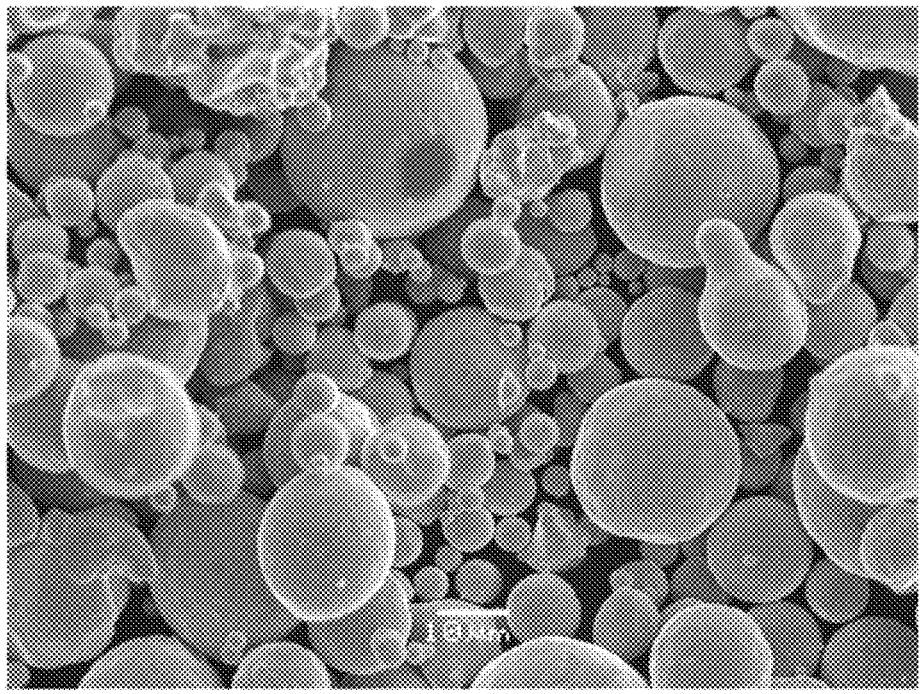
FIG. 2J is a view showing a scanning electron microscope (SEM) image for measuring the satellite adhesion ratio of a powder of Example 10 of the present invention.
Figure 2K:
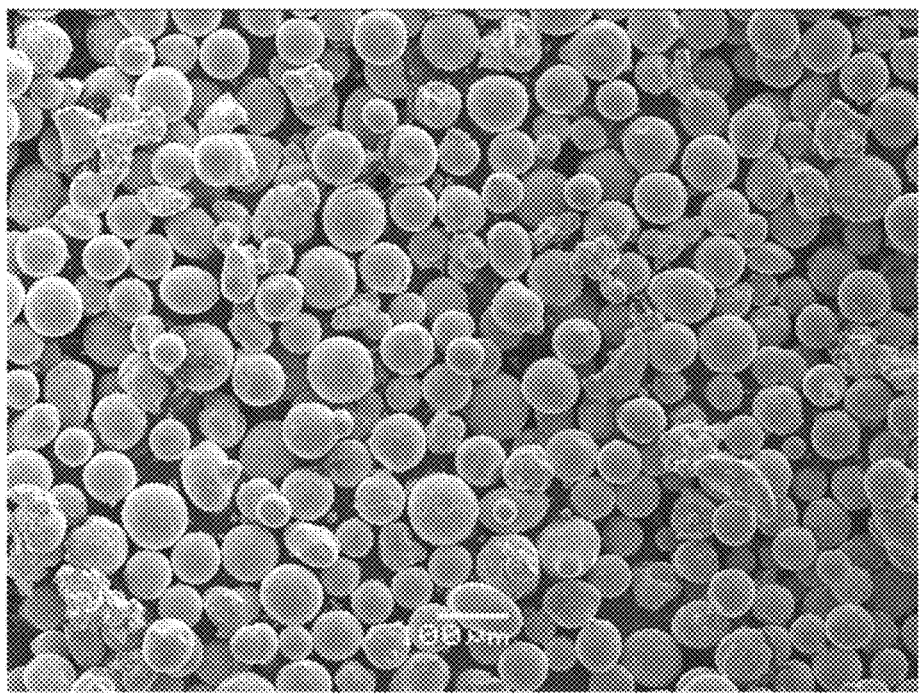
FIG. 2K is a view showing a scanning electron microscope (SEM) image for measuring the satellite adhesion ratio of a powder of Example 11 of the present invention.
Figure 2L:
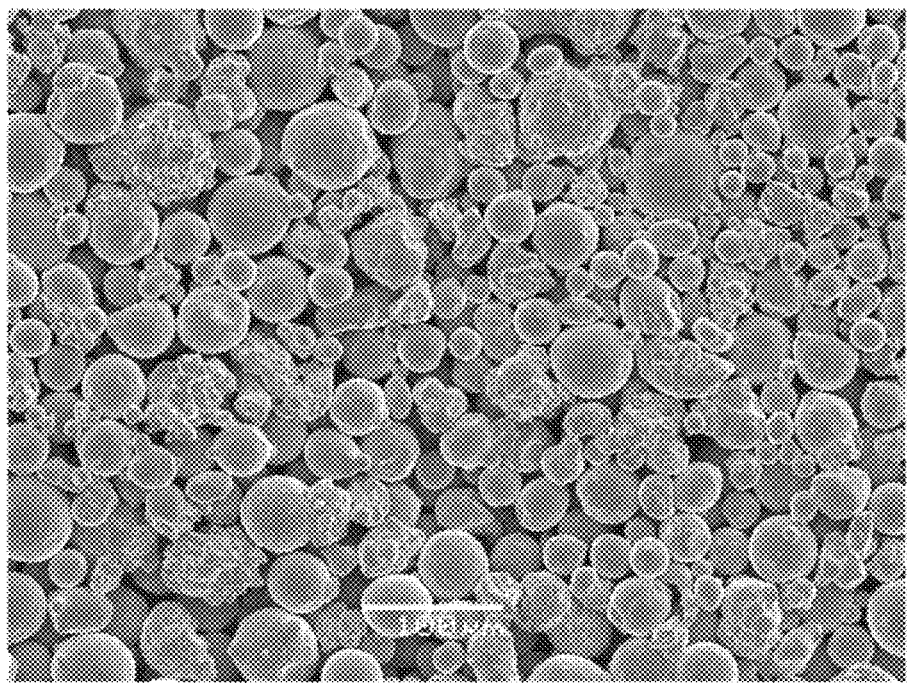
FIG. 2L is a view showing a scanning electron microscope (SEM) image for measuring the satellite adhesion ratio of a powder of Example 12 of the present invention.
Figure 2M:
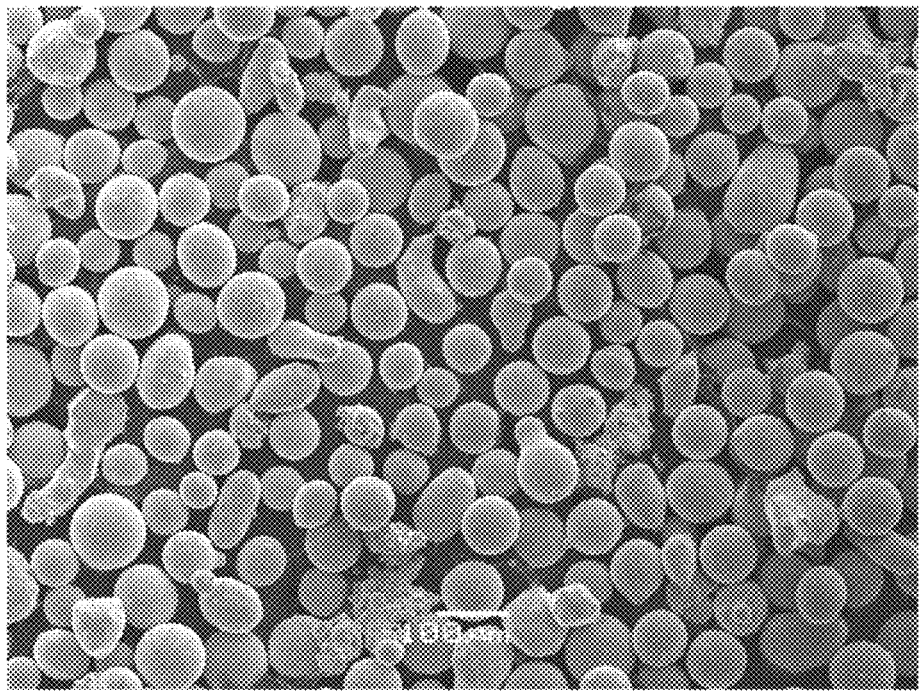
FIG. 2M is a view showing a scanning electron microscope (SEM) image for measuring the satellite adhesion ratio of a powder of Example 13 of the present invention.
Figure 2N:
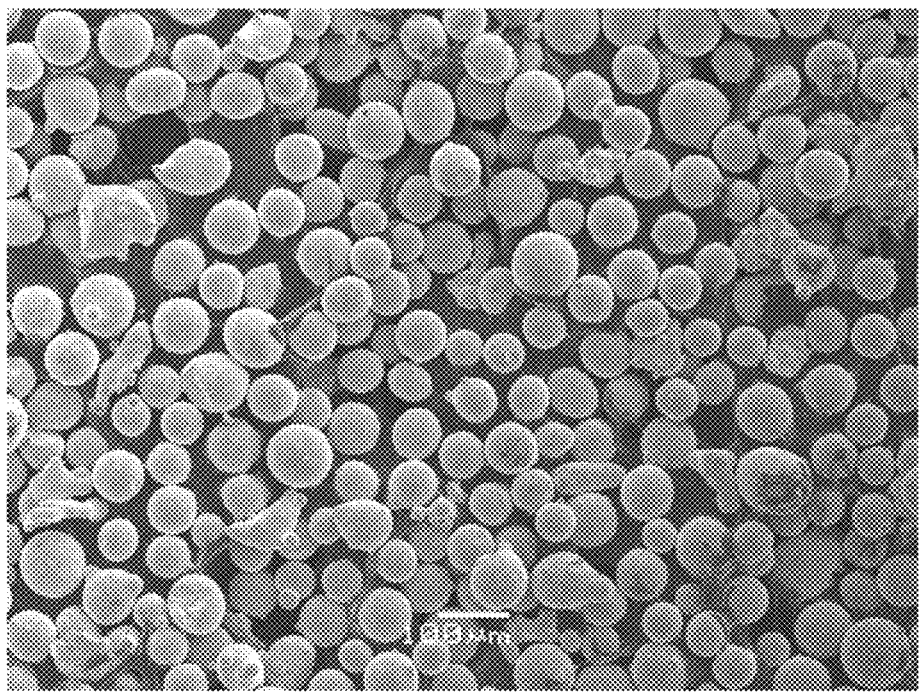
FIG. 2N is a view showing a scanning electron microscope (SEM) image for measuring the satellite adhesion ratio of a powder of Example 14 of the present invention.
Figure 20:
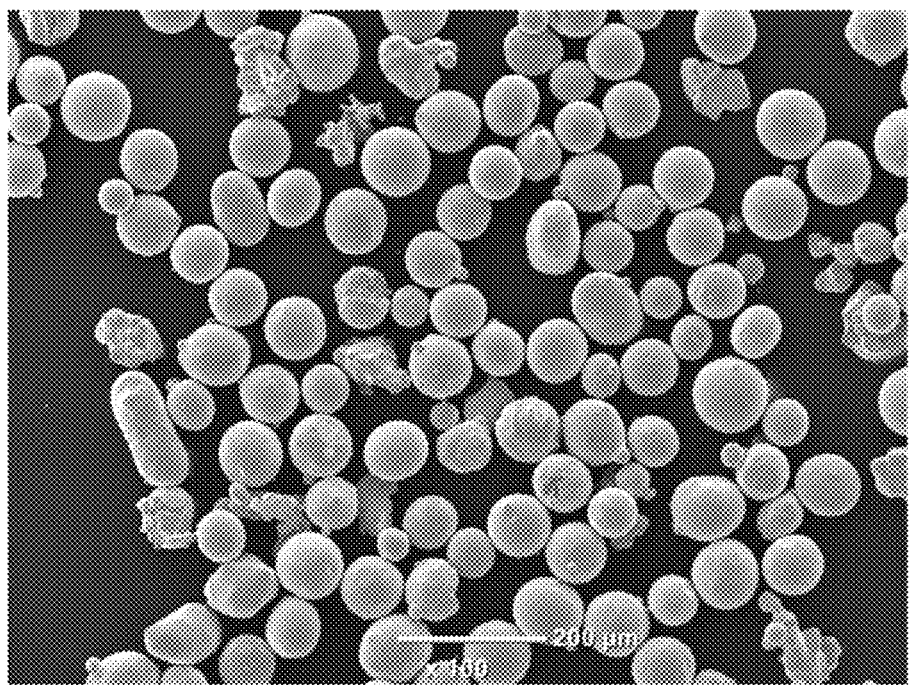
Figure 3B:
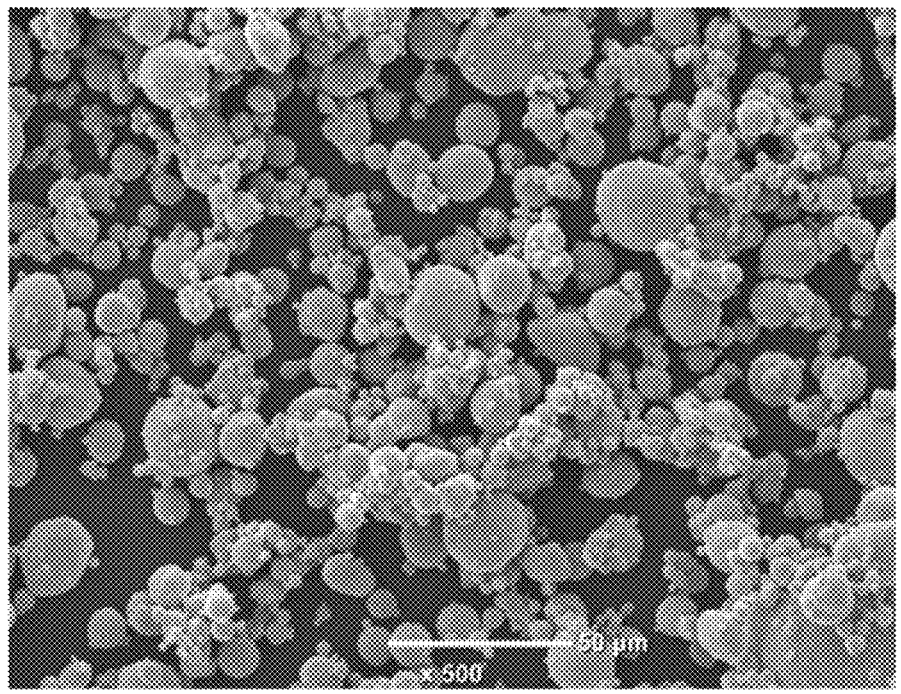
FIG. 3B is a view showing a scanning electron microscope (SEM) image for measuring the satellite adhesion ratio of a powder of Comparative Example 2 of the present invention.
Figure 3C:
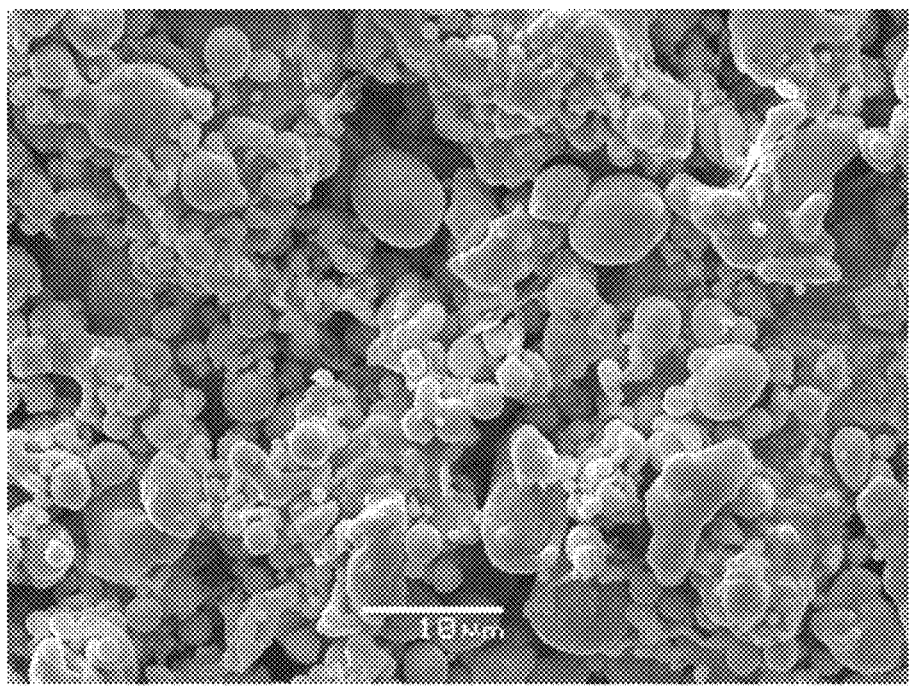
FIG. 3C is a view showing a scanning electron microscope (SEM) image for measuring the satellite adhesion ratio of a powder of Comparative Example 3 of the present invention.
Figure 3D:
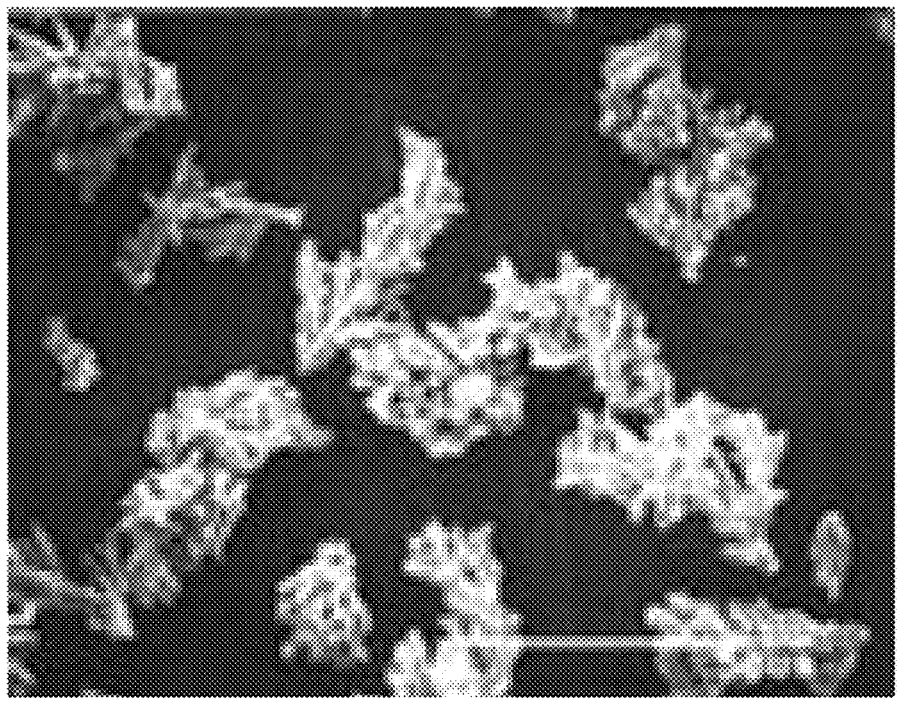
FIG. 3D is a view showing a scanning electron microscope (SEM) image for measuring the satellite adhesion ratio of a powder of Comparative Example 4 of the present invention.
Figure 3E:
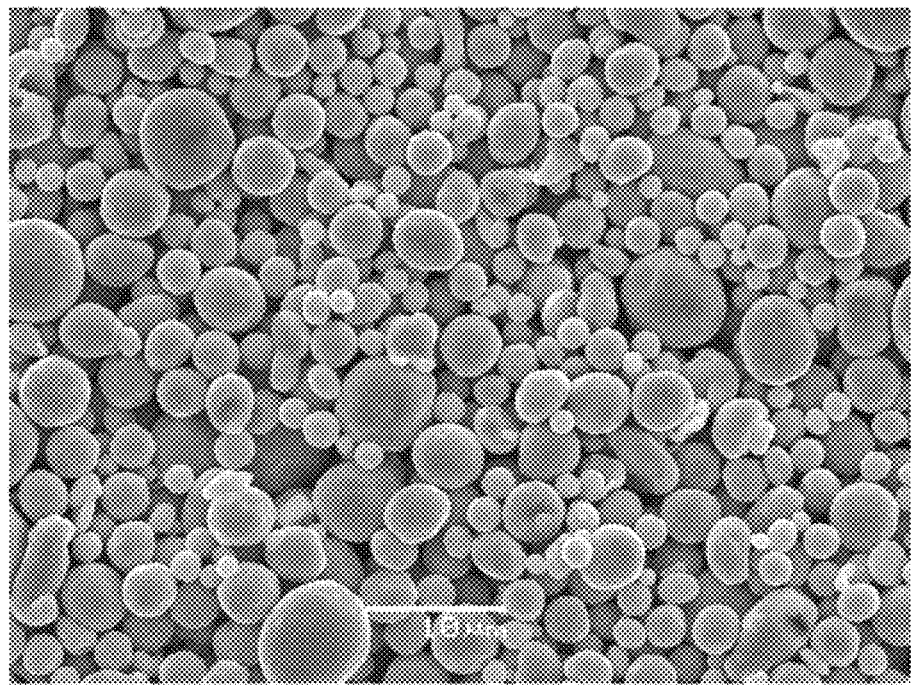
FIG. 3E is a view showing a scanning electron microscope (SEM) image for measuring the satellite adhesion ratio of a powder of Comparative Example 5 of the present invention.
Figure 3F:
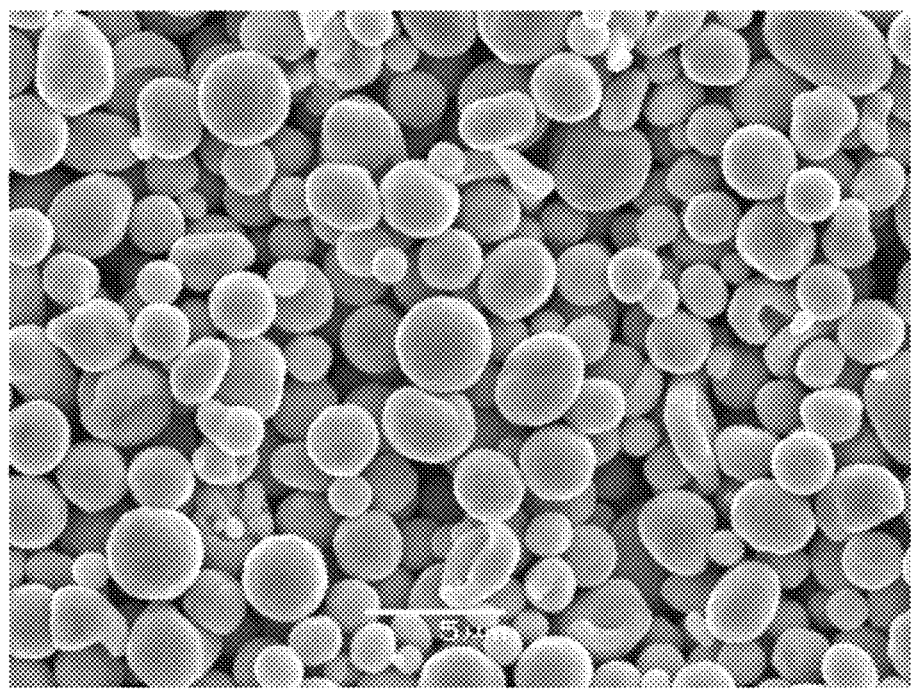
FIG. 3F is a view showing a scanning electron microscope (SEM) image for measuring the satellite adhesion ratio of a powder of Comparative Example 6 of the present invention.

FIGS. 2A to 2O are views showing scanning electron microscope (SEM) images for measuring the satellite adhesion ratios of the powders of Examples 1 to 15. FIGS. 3A to 3F are views showing scanning electron microscope (SEM) images for measuring the satellite adhesion ratios of the powders of Comparative Examples 1 to 6. The satellite adhesion ratios of the powders of the examples and the comparative examples were obtained by using these scanning electron microscope (SEM) images. Table 1 shows the correspondence between the FR (sec/50 g) measurement results complying with JIS Z 2502 and the satellite adhesion ratio measurement results in Examples 1 to 15 and Comparative Examples 1 to 6.

TABLE 1

Correspondence Table of FR (sec/50 g) and Satellite Adhesion Ratio (%)

| | FR (sec/50 g) | Satellite adhesion ratio (%) |
|---|---|---|
| Example 1 | 15.0 | 28 |
| Example 2 | 11.8 | 48 |
| Example 3 | Unmeasurable | 39 |
| Example 4 | Unmeasurable | 13 |
| Example 5 | 65.1 | 13 |

TABLE 1-continued

Correspondence Table of FR (sec/50 g) and Satellite Adhesion Ratio (%)

| | FR (sec/50 g) | Satellite adhesion ratio (%) |
|---|---|---|
| Example 6 | Unmeasurable | 43 |
| Example 7 | 21.7 | 28 |
| Example 8 | Unmeasurable | 32 |
| Example 9 | 18.1 | 18 |
| Example 10 | 18.6 | 30 |
| Example 11 | 12.3 | 41 |
| Example 12 | 11.8 | 45 |
| Example 13 | 11.4 | 32 |
| Example 14 | 11.7 | 31 |
| Example 15 | 12.3 | 7 |
| Comparative Example 1 | Unmeasurable | 51 |
| Comparative Example 2 | Unmeasurable | 70 |
| Comparative Example 3 | Unmeasurable | 65 |
| Comparative Example 4 | Unmeasurable | — |
| Comparative Example 5 | Unmeasurable | 15 |
| Comparative Example 6 | Unmeasurable | 15 |

As is apparent from Table 1, the satellite adhesion ratio measurement result can be obtained even for a copper powder or a copper alloy powder that is "unmeasurable" in the FR (sec/50 g) measurement result. Therefore, even for a powder found to be unusable by the FR (sec/50 g) measurement result, it is possible to determine whether the powder is usable as a lamination shaping powder.

«Measurements of 50% Particle Size and Apparent Density»

The 50% particle size (μm) of a copper powder or a copper alloy powder of each of Examples 1 to 15 and Comparative Examples 1 to 6 was measured by the laser diffraction method (Microtrac MT3300: manufactured by MicrotrackBEL). Also, the apparent density (g/cm$^3$) of the copper powder or the copper alloy powder was measured in accordance with JIS Z 2504.

<<Test of Squeegeeing Property>>

The squeegeeing property of a copper powder or a copper alloy powder of each of Examples 1 to 15 and Comparative Examples 1 to 6 was tested by using the jig 400 shown in FIG. 4.

Figure 5B:
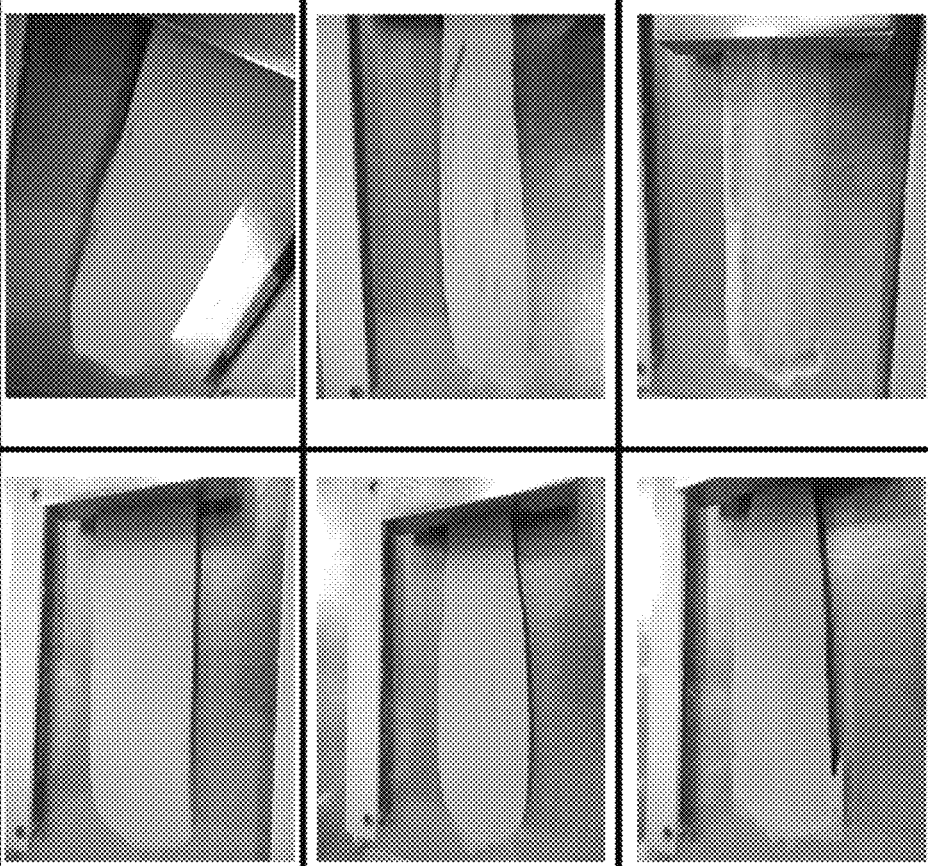
FIG. 5B is a view showing the test results of the squeegeeing properties of powders of Examples 4 and 5 of the present invention.

FIGS. 5A and 5B are views showing the test results of the squeegeeing properties of powders of Examples 1 to 5. FIG. 6 is a view showing the test results of the squeegeeing properties of powders of Comparative Examples 1 to 3. FIGS. 5A, 5B, and 6 show only some of the examples and the comparative examples, but the results of other examples and other comparative examples were also similar.

Table 2 shows the correspondence between the characteristics (the satellite adhesion ratio, 50% particle size, and apparent density) and the squeegeeing property test results of Examples 1 to 15 and Comparative Examples 1 to 6.

TABLE 2

Correspondence Table of Powder Characteristics and Squeegeeing Property

| | Satellite adhesion ratio (%) | 50% particle size (μm) | Apparent density (g/cm$^3$) | Squeegeeing property | Evaluation of manufacturability |
|---|---|---|---|---|---|
| Example 1 | 28 | 29.9 | 5.09 | ⊚ | Good |
| Example 2 | 48 | 76.5 | 4.83 | ⊚ | Good |
| Example 3 | 39 | 25.1 | 5.83 | ○ | Good |
| Example 4 | 13 | 9.73 | 4.27 | ○ | Good |
| Example 5 | 13 | 16.6 | 5.16 | ○ | Good |
| Example 6 | 43 | 25.8 | 5.28 | Δ | Good although few pores were found in manufactured product |
| Example 7 | 28 | 28.1 | 5.13 | ○ | Good |
| Example 8 | 32 | 23.6 | 5.09 | ○ | Good |
| Example 9 | 18 | 25.8 | 5.28 | ○ | Good |
| Example 10 | 30 | 31.6 | 4.35 | ○ | Good |
| Example 11 | 41 | 72.5 | 4.78 | ○ | Good |
| Example 12 | 45 | 61.2 | 4.72 | ⊚ | Good |
| Example 13 | 32 | 68.4 | 5.05 | ⊚ | Good |
| Example 14 | 31 | 68.9 | 4.98 | ⊚ | Good |
| Example 15 | 7 | 164.7 | 5.19 | ○ | Good |
| Comparative Example 1 | 51 | 16.0 | 3.44 | X | Manufacturing was impossible because powder could not evenly be spread |
| Comparative Example 2 | 70 | 17.5 | 3.57 | X | Manufacturing was impossible because powder could not evenly be spread |
| Comparative Example 3 | 65 | 8.25 | 3.40 | X | Manufacturing was impossible because powder could not evenly be spread |
| Comparative Example 4 | — | 19.6 | 0.88 | X | Manufacturing was impossible because powder could not evenly be spread |
| Comparative Example 5 | 15 | 4.67 | 3.13 | X | Packing of powder layer was insufficient and density was low |

TABLE 2-continued

Correspondence Table of Powder Characteristics and Squeegeeing Property

|  | Satellite adhesion ratio (%) | 50% particle size (μm) | Apparent density (g/cm³) | Squeegeeing property | Evaluation of manufacturability |
|---|---|---|---|---|---|
| Comparative Example 6 | 15 | 2.53 | 2.51 | X | Powder violently scattered and adhered on manufactured product again, and surface defects were found |

Squeegeeing property evaluation criteria
⊚ Very good
○ Good
Δ Unsatisfactory
X Bad «Results of Squeegeeing by Laminating and Shaping Apparatus»

Figure 7:
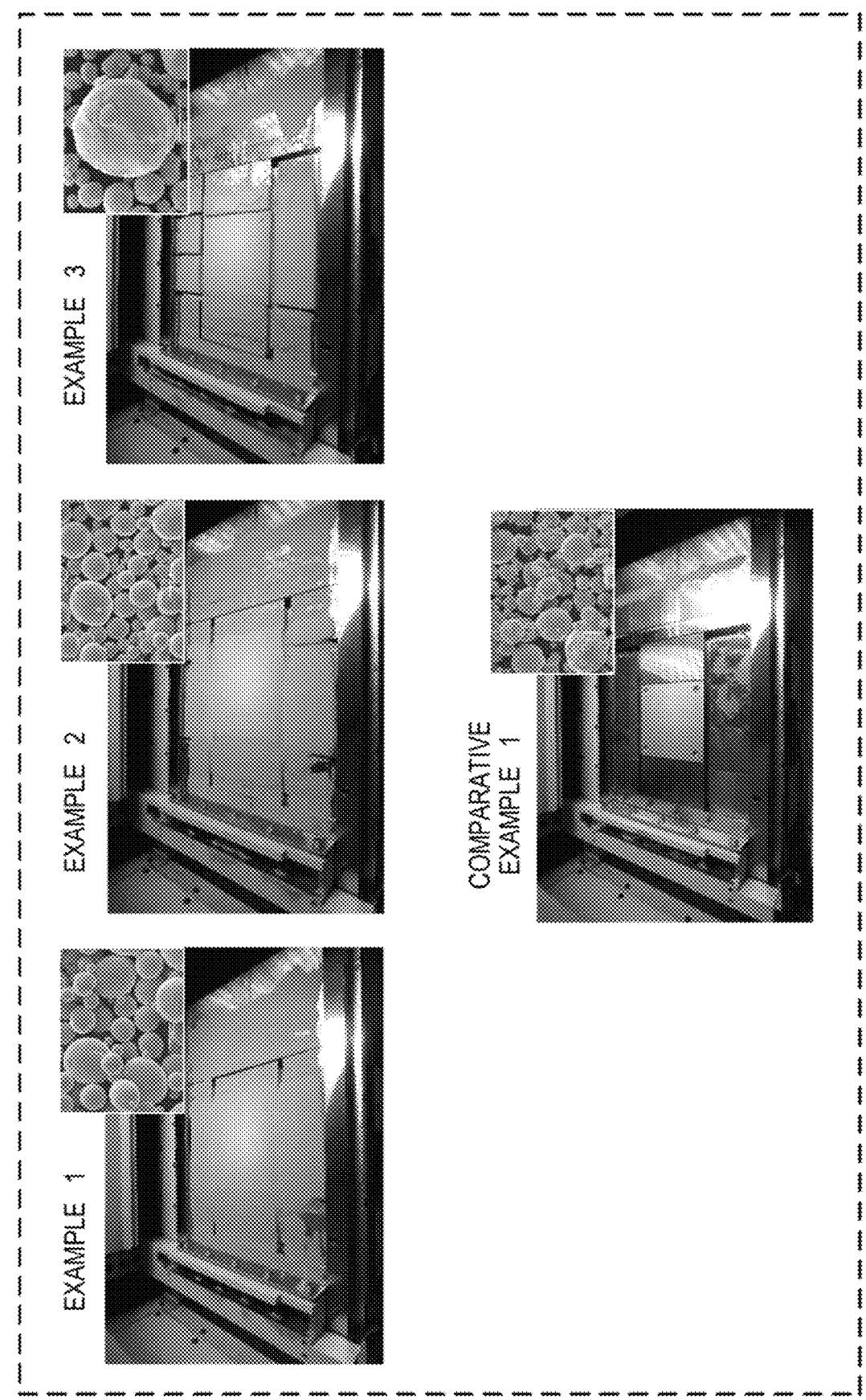
FIG. 7 is a view showing a state in which the powders of Examples 1, 3, and 5 and Comparative Example 1 of the present invention were squeegeed in the laminating and shaping apparatus.

FIG. 7 shows a state in which the powders of Examples 1, 3, and 5 and Comparative Example 1 were squeegeed in the laminating and shaping apparatus. As shown in FIG. 7, when using a powder found to have a good squeegeeing property in Table 2, squeegeeing in the laminating and shaping apparatus was also good. By contrast, when using a powder found to have an unsatisfactory or bad squeegeeing property in Table 2, squeegeeing in the laminating and shaping apparatus was also unsatisfactory.

Accordingly, evaluation by the satellite adhesion ratio, 50% particle size, and apparent density as the squeegeeing property criteria disclosed in this example embodiment were found to be useful.

«Measurement of Adhesive Force»

The shearing stress of a copper powder or a copper alloy powder was measured by using a searing stress measurement kit shown in FIG. 8A and input to Powder Rheometer FT4 (manufactured by Malvern Instruments), and the adhesive force was calculated in accordance with FIG. 8B. Table 3 shows the correspondence between the characteristics (the satellite adhesion ratio, 50% particle size, apparent density, and adhesive force) and the squeegeeing property test results of Examples 1 to 15 and Comparative Examples 1 to 6.

TABLE 3

Correspondence Table of FR (sec/50 g), Adhesive Force (kPa), and Satellite Adhesion Ratio (%), and Squeegeeing Property

|  | FR (sec/50 g) | Satellite adhesion ratio (%) | Adhesive force (kPa) | Squeegeeing property |
|---|---|---|---|---|
| Example 1 | 15.0 | 28 | 0.337 | ⊚ |
| Example 2 | 11.8 | 48 | 0.157 | ⊚ |
| Example 3 | Unmeasurable | 39 | 0.374 | ○ |
| Example 4 | Unmeasurable | 13 | 0.284 | ○ |
| Example 5 | 65.1 | 13 | 0.282 | ○ |
| Example 6 | Unmeasurable | 43 | 0.425 | ○ |
| Example 7 | 21.7 | 28 | 0.306 | ○ |
| Example 8 | Unmeasurable | 32 | 0.318 | ○ |
| Example 9 | 18.1 | 18 | 0.447 | ○ |
| Example 10 | 18.6 | 30 | 0.348 | ○ |
| Example 11 | 12.3 | 41 | 0.369 | ○ |
| Example 12 | 11.8 | 45 | 0.424 | ⊚ |
| Example 13 | 11.4 | 32 | 0.215 | ⊚ |
| Example 14 | 11.7 | 31 | 0.269 | ⊚ |
| Example 15 | 12.3 | 7 | 0.426 | ○ |
| Comparative Example 1 | Unmeasurable | 51 | 0.682 | X |
| Comparative Example 2 | Unmeasurable | 70 | 0.741 | X |
| Comparative Example 3 | Unmeasurable | 65 | 0.482 | X |
| Comparative Example 4 | Unmeasurable | — | 0.646 | X |
| Comparative Example 5 | Unmeasurable | 15 | 0.427 | X |
| Comparative Example 6 | Unmeasurable | 15 | 1.170 | X |

The invention claimed is:

1. A method of evaluating a squeegeeing property of a powder for use in lamination shaping, the method comprising the steps of:
    obtaining a satellite adhesion ratio of the powder as a ratio of a number of particles on which satellites are adhered to a number of all particles included in the powder;
    measuring an apparent density of the powder in a JIS Z 2504:2012 compliant way corresponding to ISO 3923-1:2008; and
    evaluating whether the squeegeeing property of the powder is suitable to be spread into a uniform powder layer in the lamination shaping based at least in part on whether the following evaluation criteria are met: (a) the satellite adhesion ratio of the powder is equal to or less than 50% and (b) an apparent density of the powder is equal to or more than 3.5 g/cm³, the squeegeeing property of the powder being evaluated as unsuitable for the lamination shaping unless at least evaluation criteria (a) and (b) are met.

2. The method according to claim 1, wherein the powder is metal powder or metal alloy powder.

3. The method according to claim 2, wherein the metal powder or the metal alloy is copper powder or copper alloy powder.

4. The method according to claim 1, wherein the powder is copper powder or copper alloy powder.

5. The method according to claim 1, further comprising a step of obtaining a 50% particle size of the powder by a laser diffraction method;

wherein the evaluation as to whether the squeegeeing property of the powder is suitable to be spread into a uniform powder layer in the lamination shaping is also based on whether the following evaluation criterion is met: (c) the 50% particle size of the powder is 3 to 250 µm, the squeegeeing property of the powder being evaluated as unsuitable for the lamination shaping unless at least evaluation criteria (a), (b) and (c) are met.

6. The method according to claim 5, wherein the powder is copper powder or copper alloy powder.

7. The method according to claim 5, further comprising a step of calculating an adhesive force of the powder from a failure envelope obtained by a shear test performed by a powder rheometer;
wherein the evaluation as to whether the squeegeeing property of the powder is suitable to be spread into a uniform powder layer in the lamination shaping is also based on whether the following evaluation criterion is met: (d) the adhesive force is equal to or less than 0.450 kPa; the squeegeeing property of the powder being evaluated as unsuitable for the lamination shaping unless at least evaluation criteria (a), (b), (c) and (d) are met.

8. The method according to claim 5, wherein the powder is metal powder or metal alloy powder.

9. The method according to claim 1, further comprising a step of calculating an adhesive force of the powder from a failure envelope obtained by a shear test performed by a powder rheometer;
wherein the evaluation as to whether the squeegeeing property of the powder is suitable to be spread into a uniform powder layer in the lamination shaping is also based on whether the following evaluation criterion is met: (d) the adhesive force is equal to or less than 0.450 kPa, the squeegeeing property of the powder being evaluated as unsuitable for the lamination shaping unless at least evaluation criteria (a), (b) and (d) are met.

10. The method according to claim 9, wherein the powder is metal powder or metal alloy powder.

* * * * *